US012583209B2

(12) United States Patent

Fukui et al.

(10) Patent No.: US 12,583,209 B2

(45) Date of Patent: Mar. 24, 2026

(54) MULTILAYER BODY COMPOSED OF CURED ORGANOPOLYSILOXANE FILMS, USE OF SAME, AND METHOD FOR PRODUCING SAME

(71) Applicant: DOW TORAY CO., LTD., Tokyo (JP)

(72) Inventors: Hiroshi Fukui, Ichihara (JP); Kyoko Toyama, Ichihara (JP); Masayasu Akasaka, Ichihara (JP); Takeaki Tsuda, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 614 days.

(21) Appl. No.: 18/013,879

(22) PCT Filed: Jun. 21, 2021

(86) PCT No.: PCT/JP2021/023398

§ 371 (c)(1),
(2) Date: Dec. 29, 2022

(87) PCT Pub. No.: WO2022/004462

PCT Pub. Date: Jan. 6, 2022

(65) Prior Publication Data

US 2023/0295432 A1 Sep. 21, 2023

(30) Foreign Application Priority Data

Jun. 30, 2020 (JP) ................................ 2020-112309

(51) Int. Cl.
| | |
|---|---|
| *B32B 27/28* | (2006.01) |
| *B32B 27/20* | (2006.01) |
| *C08L 83/04* | (2006.01) |
| *C09D 183/04* | (2006.01) |

(52) U.S. Cl.
CPC ............ *B32B 27/283* (2013.01); *B32B 27/20* (2013.01); *C08L 83/04* (2013.01); *C09D 183/04* (2013.01); *B32B 2307/202* (2013.01); *B32B 2307/204* (2013.01)

(58) Field of Classification Search
CPC ..... B32B 27/283; C08L 83/04; C09D 183/04; C09J 183/04
See application file for complete search history.

(56) References Cited

U.S. PATENT DOCUMENTS

| | | | |
|---|---|---|---|
| 2006/0094834 A1 | 5/2006 | Aoki et al. | |
| 2011/0180789 A1 | 7/2011 | Han et al. | |
| 2013/0236730 A1* | 9/2013 | Bose ..................... | H10N 30/05 427/521 |
| 2015/0344671 A1 | 12/2015 | Furukawa et al. | |
| 2018/0329260 A1 | 11/2018 | Mizusaki et al. | |
| 2020/0181408 A1 | 6/2020 | Beyer et al. | |
| 2021/0238365 A1* | 8/2021 | Fukui ..................... | C08G 77/20 |
| 2022/0064448 A1 | 3/2022 | Fukui et al. | |

FOREIGN PATENT DOCUMENTS

| | | |
|---|---|---|
| CN | 104093560 A | 10/2014 |
| JP | 2004202966 A | 7/2004 |
| JP | 2013120279 A | 6/2013 |
| JP | 5848591 B2 * | 1/2016 |
| JP | 2016503108 A | 2/2016 |
| JP | 2019504918 A | 2/2019 |
| JP | 2019195950 A | 11/2019 |
| TW | 202012515 A | 4/2020 |
| WO | 2014105959 A1 | 7/2014 |
| WO | 2014105970 A1 | 7/2014 |
| WO | 2019124419 A1 | 6/2019 |
| WO | 2020100439 A1 | 5/2020 |
| WO | 2020116596 A1 | 6/2020 |

OTHER PUBLICATIONS

English translation of International Search Report for PCT/JP2021/023398 dated Aug. 24, 2021, 2 pages.
Machine assisted English translation of JP2019195950A obtained from https://worldwide.espacenet.com/patent on Apr. 28, 2023, 12 pages.
Machine assisted English translation of JP2013120279A obtained from https://worldwide.espacenet.com/patent on Apr. 28, 2023, 13 pages.
Kujawski, M., et al., "Elastomers filled with exfoliated graphite as compliant electrodes", Carbon 48 (2010) 2409-2417.
Rosset, Samuel et al., "Flexible and stretchable electrodes for dielectric elastomer actuators", Applied Physics A (2013) 110:281-307.

* cited by examiner

*Primary Examiner* — Marc S Zimmer
(74) *Attorney, Agent, or Firm* — Warner Norcross + Judd LLP

(57) ABSTRACT

A laminate body is provided, in which two or more organopolysiloxane cured films are obtained by curing curable organopolysiloxane compositions having different compositions because, e.g., the functions required for a dielectric layer and electrode layer are different. In general, problems such as peeling and defects due to insufficient adhesive strength and trackability do not easily occur at an interface between the cured films forming the laminate body. Applications and methods are also provided. The laminate body comprises a structure with two or more laminated organopolysiloxane cured films with different compositions. At least a portion of functional groups involved in the curing reaction are the same. The laminated cured films have structures chemically bonded at an interface thereof. Typically, the compositions both contain a hydrosilylation reactive group, and a SiH/Vi ratio in the compositions differ, with the laminated cured films having structures chemically bonded by hydrosilylation reactions at an interface thereof.

15 Claims, No Drawings

MULTILAYER BODY COMPOSED OF CURED ORGANOPOLYSILOXANE FILMS, USE OF SAME, AND METHOD FOR PRODUCING SAME

CROSS-REFERENCE TO RELATED APPLICATIONS

This application is the U.S. National Stage of International Application No. PCT/US2021/023398 filed on 21 Jun. 2021, which claims priority to and all advantages of Japanese Patent Application No. 2020-112309 filed on 30 Jun. 2020, the content of which is incorporated herein by reference.

TECHNICAL FIELD

The present invention relates to: a laminate body in which at least two types of organopolysiloxane cured films are laminated; application of same; manufacturing method of same; and a manufacturing device.

BACKGROUND ART

Organopolysiloxane cured products having a polysiloxane skeletal structure have excellent transparency, electrical insulation, heat resistance, cold resistance, and the like, can have improved electrical activity, if so desired, by introducing a high dielectric functional group such as a fluoroalkyl group or the like, and can be easily processed into a film or sheet. Therefore, the organopolysiloxane cured products used in various applications such as adhesive films used in various electric and electronic devices and electroactive films used in actuators and other transducer devices are classified into a hydrosilylation reaction curing type, condensation reaction curing type, peroxide curing type, and the like, based on the curing mechanism. In particular, organopolysiloxane cured films using hydrosilylation reaction curing type curable organopolysiloxane compositions are widely used because they are quick curing when left at room temperature or heated, with no generation of byproducts.

Meanwhile, when an organopolysiloxane cured film is used as an electronic member such as a touch panel or the like, an electronic component for a display device, and particularly as a transducer material for a sensor, actuator, or the like, an electrode layer must be provided on an electroactive film serving as a dielectric layer. For example, Non-Patent Documents 1 and 2 propose forming an electrode layer with a conductive filler added in a silicone elastomer matrix with excellent flexibility to form an electrode layer with excellent trackability to a dielectric layer.

However, when attempting to form an electrode layer with a conductive filler added on an organopolysiloxane cured film, which is an electroactive film, particularly with displacement of the dielectric layer (e.g., expansion and contraction of actuators, and the like), interface peeling of the dielectric layer and electrode layer may occur, leading to inferior current flow and reduced reliability as an actuator. In Patent Document 3 and the like, the present applicants have proposed coating a curable organopolysiloxane composition containing a conductive filler on the organopolysiloxane cured film, which is an electroactive film, to form an electrode layer, which is an organopolysiloxane cured film, on the electroactive film (=dielectric layer). However, as an actuator or other transducer material, the problem of peeling due to a lack of trackability of the electrode surface has not been completely solved, and there is still room for improvement.

RELATED ART DOCUMENTS

Non-Patent Documents

Non-Patent Document 1: Kujawski, M.; Pearse, J. D.; Smela, E. Carbon 2010, 48, 2409-2417.
Non-Patent Document 2: Rosset, S.; Shea, H. R. Appl. Phys. A 2013, 110, 281-307.

PATENT DOCUMENTS

Patent Document 1: WO 2014/105959

SUMMARY OF THE INVENTION

Problem to be Solved by the Invention

In view of the foregoing, an object of the present invention is to provide: a laminated body in which two or more organopolysiloxane cured films obtained by curing curable organopolysiloxane compositions having different compositions because the functions required for a dielectric layer and electrode layer are different, and in which problems such as peeling and defects due to insufficient adhesive strength and trackability do not easily occur at an interface between the cured films forming the laminate body; and an application and manufacturing method thereof.

Means for Solving the Problem

As a result of extensive studies, the present inventors discovered that the problem can be solved by a laminate body containing a structure with two or more laminated organopolysiloxane cured films obtained by curing curable organopolysiloxane compositions with different compositions where at least a portion of functional groups involved in the curing reaction are the same, wherein the laminated organopolysiloxane films have structures chemically bonded at an interface thereof, thereby arriving at the present invention.

Herein, at least one of the laminated organopolysiloxane cured films may be an electrode layer obtained by curing a composition containing electrically conductive microparticles, and the other may be a dielectric layer obtained by curing a composition with a dielectric functional group or without electrically conductive microparticles. Furthermore, the compositions with mutually different compositions for providing mutually laminated organopolysiloxane cured products preferably both contain curable reactive groups for curing by a hydrosilylation reaction and differ in the amount of silicon atom-bonded hydrogen atoms in the component per 1 mol of carbon-carbon double bonds in the composition, and the laminated organopolysiloxane cured films preferably have structures chemically bonded by a hydrosilylation reaction at an interface thereof.

Effects of the Invention

The present invention can provide: a laminate body having two or more alternately laminated organopolysiloxane cured films that differ in composition before curing, in which problems such as peeling and defects due to a lack of adhesive strength and trackability do not readily occur at the interface between the cured films; and an application and manufacturing method thereof. In particular, the present invention can provide: a laminate body having a structure in which organopolysiloxane cured films, which are cured by a hydrosilylation reaction and have functions of an electrode layer and a dielectric layer, are alternately laminated, the laminate body having excellent reliability in applications such as actuators and the like, due to being resistant to electrification defects and interface peeling between the films; and a manufacturing method thereof.

DESCRIPTION OF THE PREFERRED EMBODIMENT

[Laminate Body]

The laminate body according to the present invention contains a structure with two or more laminated organopolysiloxane cured films obtained by curing curable organopolysiloxane compositions with different compositions where at least a portion of functional groups involved in the curing reaction are the same, wherein the laminated organopolysiloxane films have structures chemically bonded at an interface thereof. Three or more layers of the organopolysiloxane cured films may be laminated, so long as the compositions prior to curing are mutually different, and three or more different types of organopolysiloxane cured films may be laminated. The laminate body according to the present invention may have a multilayer structure of two or more layers, and so long as at least a portion of the laminate body has a structure in which organopolysiloxane cured films with two different compositions are laminated, other laminated portions may have a structure in which organopolysiloxane cured films of the same type are laminated (for example, a partial structure in which cured films with a dielectric layer function are laminated to increase the thickness). In particular, a portion or all of the laminate body particularly preferably has a structure in which organopolysiloxane cured films of two different types of compositions (e.g., cured films that are a dielectric layer and electrode layer) are alternately laminated.

As an example, when organopolysiloxane cured films L1, L2, L3 . . . , with different compositions before curing, are laminated, the following overall or partial configuration of the laminate body is suitably exemplified by expressing interfaces thereof using "/". Note that [ ] n refers to a laminated structure in which the structure in parentheses is repeated n or more times, and n independently represents a number greater than or equal to 0. Furthermore, "/" indicates that the respective layers face one another in a lamination direction of the laminate body (typically a thickness direction orthogonal to the surface of each functional layer).

L1/L2, L1/[L2/L1]n/L2/L1; L2/[L1/L2]n/L1/L2; L2/L1/[L1/]n/L2; L1/L2/L3; L1/L2/L3/L4

When the laminate body according to the present invention is used in transducer (sensor, actuator, generator) applications, the organopolysiloxane cured film serving as the electrode layer is preferably laminated on at least one surface of the organopolysiloxane cured film serving as the dielectric layer, and the laminated organopolysiloxane cured films preferably have structures chemically bonded at an interface thereof. Specifically, the previous laminate body configuration preferably has a whole or partial structure in which the layers expressed by L2/[L1/L2]n/L1/L2, with L1 representing an organopolysiloxane cured film that is a dielectric layer and L2 representing an organopolysiloxane cured film that is an electrode layer, are alternately laminated with the electrode layer disposed on the outer side. Note that the dielectric layer of L1 may be replaced by a multilayer structure with one or more layers, such as L1/[L1/]n. Needless to say, multilayered dielectric layers may and preferably have chemically bonded structures at interfaces thereof.

Furthermore, the laminate body according to the present invention may have an electrode layer and a single or multilayered dielectric layer, as well as a pressure-sensitive adhesive layer used for placing in a transducer, or a non-silicone thermoplastic resin layer that may optionally have a release surface. In particular, when used as a member of an electronic device, the following combinations can be exemplified as a structure of the laminate body, and in the present invention, the dielectric layer and electrode layer, dielectric layer and pressure-sensitive adhesive layer or electrode layer and pressure-sensitive adhesive layer are chemically bonded at interfaces ("/") thereof. Note that the following combinations are examples, and it goes without saying that the present invention is not limited thereto. The laminate body may not be symmetrical as some of the examples show. Furthermore, in the examples, each functional layer is exemplified below, where "/" has the same meaning as above.

(L1) Highly dielectric sheet containing a single or multilayered polymer cured product having a dielectric functional group: (EAP)

(L2) Silicone pressure-sensitive adhesive layer: (PSA)

(L3) Electrode layer: (EL)

(L4) Non-silicone thermoplastic resin layer: (PF)

Example 1: PSA/EAP/PSA

Example 2: PSA/EL/EAP/EUPSA

Example 3: PSA/PF/EAP/PF/PSA

Example 4: PSA/EL/PF/EAP/PF/EL/PSA

Example 5: PSA/PF/EL/EAP/EL/PF/PSA

Example 6: PF/PSA/EL/EAP/EL/PSA/PF

Example 7: EL/PSA/EAP/PSA/EL

Example 8: PF/PSA/EL/EAP/PF/PSA/EL

Example 9: EL/PSA/EAP/EL

Example 10: EL/PSA/EAP/EL/PSA

Example 11: PF/PSA/EAP/PF

Example 12: PF/PSA/EAP/PF/PSA

Example 13: EL/PSA/PF/EAP/PF/PSA/EL

Note that for a laminate body with an electrode layer formed on PSA, such as Example 7, Example 13, and the like, the laminate body may be shipped as a peelable laminate body containing a separator on the PSA, and the separator may be peeled off later to provide an electrode layer on the PSA. Furthermore, a laminate body, in which the non-silicone thermoplastic resin layers of Examples 6 and 11 form an outer layer, may be treated as an electronic device member containing these resin layers, or as a peelable laminate body provided with a release surface on an inner surface of the laminate body of these resin layers.

In the present invention, a particularly preferable form is a laminate body having a structure in which a single or multilayer dielectric layer (EAP) and an electrode layer (EL) are chemically bonded at an interface thereof, and a laminate body having a whole or partial structure in which these layers are alternately laminated and an electrode layer is disposed on the outer side, such as (EL/EAP/)$_n$EL. Herein, n represents a number greater than or equal to 1, and may be laminated at an arbitrary number of repetitions based on the thickness of the laminate body required for the transducer and the like.

The laminate body according to the present invention is characterized in that organopolysiloxane cured films with different compositions before curing have structures chemically bonded at an interface thereof. In the present invention, since the structure is formed by a reaction of curing reactive functional groups included in each film or precursors thereof at the interface of the films with different compositions before curing, the organopolysiloxane cured films above must have at least some of the functional groups involved in the curing reaction in common. Note that the type of curing reaction described below is not limited and may be one or more type of reaction, but the laminated organopolysiloxane cured films particularly preferably have a chemically bonded structure at an interface thereof by a hydrosilylation reaction with an alkenyl group and silicon atom-bonded hydrogen atom. Note that such bonding can be preferably achieved by adjusting the amount of silicon atom-bonded hydrogen atoms in the composition, a manufacturing method of coating and curing the curable organopolysiloxane composition, or a combination thereof, as described later.

The organopolysiloxane cured films forming the laminate body are not particularly limited in the composition and physical properties thereof, but at least one preferably has a volume resistivity of $10^2$ $\Omega$·cm or less and preferably contains electrically conductive microparticles (particularly preferably, microparticles containing at least one type of electrically conductive carbon selected from conductive carbon black, graphite and vapor phase grown carbon (VGCF)) as described later. An organopolysiloxane cured film with such electrical conductivity is suitable as an electrode layer.

At least one of the organopolysiloxane cured films configuring the laminate body preferably has a shear storage modulus (G') at 120° C. within a range of $5.0 \times 10^4$ to $1.5 \times 10^5$. An organopolysiloxane cured film with such shear storage modulus is particularly suitable as an electrode layer.

Regarding other mechanical properties, the compressive residual strain (%) of the organopolysiloxane cured film according to the present invention is preferably less than 10%, more preferably less than 5%, and particularly preferably 4% or less.

Furthermore, a composition providing an organopolysiloxane cured film according to the present invention can be designed to have the following mechanical properties measured when heated and molded into a sheet having a thickness of 2.0 mm, based on JIS K 6249. Compositions providing such properties are particularly suitable to a dielectric layer, but are not limited thereto.

(1) The Young's modulus (MPa) at room temperature is 0.001 to 10 MPa, suitably within 0.001 to 2 MPa, and in particular, suitably within a range of 0.001 to 1.5 MPa.

(2) The tear strength (N/mm) at room temperature is 1 N/mm or higher, particularly preferably within a range of 2 N/mm or higher.

(3) The tensile strength (MPa) at room temperature is 1 MPa or higher, particularly preferably within a range of 2 MPa or higher.

(4) The elongation at break (%) can be 50% or higher, particularly preferably within a range of 100 to 1,000%.

[Organopolysiloxane Cured Film]

The organopolysiloxane cured product of the present invention is obtained by curing a curable organopolysiloxane composition into a film shape. The curing reaction mechanism is not particularly limited. Examples include: a hydrosilylation reaction curing type using an alkenyl group and a silicon atom-bonded hydrogen atom; a dehydration condensation reaction curing type or a dealcoholization condensation reaction curing type using a silanol group and/or a silicon atom-bonded alkoxy group; a peroxide curing reaction type using an organic peroxide; a radical reaction curing type using high energy beam irradiation on a mercapto group; and the like. It is desirable to use a hydrosilylation reaction curing type, a peroxide reaction curing type, a radical reaction curing type, or a combination thereof, because the entire composition is cured relatively quickly and the reaction can be easily controlled. A hydrosilylation reaction curable organopolysiloxane composition is preferably used. These curing reactions proceed with heating, irradiating with high energy radiation, or a combination thereof.

The curable organopolysiloxane composition providing the organopolysiloxane cured film in the present invention preferably at least contains: (A) an organopolysiloxane with a curing reactive group having at least two carbon-carbon double bonds in one molecule; (B) an organohydrogenpolysiloxane having at least two silicon-bonded hydrogen atoms in the molecule (in an amount within a range in which the amount of silicon atom-bonded hydrogen atoms in the component is 0.5 to 2.5 mol per 1 mol of the total amount of alkenyl groups in the composition); and (C) an effective amount of a hydrosilylation reaction catalyst.

Note that in the composition providing the organopolysiloxane cured film to be used as a dielectric layer, the aforementioned component (A) more preferably is an organopolysiloxane mixture containing: (a1) a straight chain or branched chain organopolysiloxane having an alkenyl group only at the end of a molecular chain; and (a2) an organopolysiloxane resin containing an alkenyl group having at least one branched siloxane unit in a molecule with an amount of vinyl ($CH_2=CH-$) groups within a range of 1.0 to 5.0 mass %.

The aforementioned component (A) is an organopolysiloxane having a curing reactive group containing a carbon-carbon double bond, with examples including organopolysiloxanes in straight chain, branched chain, cyclic, or resin (network) organopolysiloxanes containing a curing reactive group in a molecule, selected from vinyl groups and other alkenyl groups with 2 to 20 carbon atoms, 3-acryloxypropyl groups, 3-methacryloxypropyl groups, and other (meth) acryl groups.

The organopolysiloxane serving as component (A) may contain a group selected from monovalent hydrocarbon groups that do not have a carbon-carbon double bond in a molecule, hydroxyl groups, and alkoxy groups with 1 to 3 carbon atoms. Furthermore, the monovalent hydrocarbon group may have some hydrogen atoms partially substituted with a halogen atom or hydroxyl group, and when used as a dielectric layer, the dielectric functional group described later may be introduced. Methyl groups, phenyl groups, hydroxyl groups, alkoxy groups, and dielectric functional groups as described later are industrially preferred. Note that when component (A) contains a hydroxyl group or the like, the component has condensation reactivity in addition to hydrosilylation reaction curability.

When used in a dielectric layer, preferably, component (A) may be an organopolysiloxane expressed by the following average composition formula:

$$R^1_a R^2_b SiO_{(4-a-b)/2}$$

or a mixture thereof.

In the formula, $R^1$ represents a curing reactive group containing a carbon-carbon double bond, $R^2$ represents a group selected from monovalent hydrocarbon groups that do not have a carbon-carbon double bond, hydroxyl groups, and alkoxy groups, and a and b represent numbers satisfying the following conditions: $1 \leq a+b \leq 3$ and $0.001 \leq a/(a+b) \leq 0.33$, preferably numbers satisfying the following conditions: $1.5 \leq a+b \leq 2.5$ and $0.005 \leq a/(a+b) \leq 0.2$. This is because the flexibility of the cured product increases when a+b are above the lower limit of the aforementioned range, while the mechanical strength of the cured product increases when a+b are below the upper limit of the range; therefore, the mechanical strength of the cured product increases when a/(a+b) is above the lower limit of the range, while flexibility of the cured product increases when a/(a+b) is below the upper limit of the range.

When used in a dielectric layer, component (A) according to the present invention is particularly preferably an organopolysiloxane mixture containing:

(a1) a straight chain or branched chain organopolysiloxane having an alkenyl group only at the end of a molecular chain; and (a2) an organopolysiloxane resin containing an alkenyl group having at least one branched siloxane unit in a molecule with an amount of vinyl (CH2=CH—) groups within a range of 1.0 to 5.0 mass %.

Component (a1) is a straight chain or branched chain organopolysiloxane having a siloxane unit expressed by $$(Alk)R^2_2SiO_{1/2}$$

(wherein, Alk represents an alkenyl group having two or more carbon atoms) at the end of a molecular chain, and wherein other siloxane units are essentially only a siloxane unit represented by $R^2_2SiO_{2/2}$. Note that $R^2$ represents the same group as described above. Furthermore, the degree of siloxane polymerization of component (A1-1) is within a range of 7 to 1002 including terminal siloxane units, but may be within a range of 102 to 902. Such a component (A1-1) is particularly preferably a straight chain organopolysiloxane in which both ends of the molecular chain are blocked with a siloxane unit represented by $(Alk)R^2_2SiO_{2/2}$.

The component (a2) is an alkenyl group-containing organopolysiloxane resin. Average unit formula:

$$(RSiO_{3/2})o(R_2SiO_{2/2})p(R_3SiO_{1/2})q(SiO_{4/2})r(XO_{1/2})s$$

The alkenyl group-containing organopolysiloxane resin represented above is exemplified.

In the formula, R represents a group selected from alkenyl groups and monovalent hydrocarbon groups that do not have a carbon-carbon double bond, while X represents a hydrogen atom or an alkenyl group having 1 to 3 carbon atoms. However, of all Rs, R is an alkenyl group at least in a range where the amount of vinyl (CH2=CH—) groups in the organopolysiloxane resin satisfies a range of 1.0 to 5.0 mass %, and at least a portion of Rs in the siloxane unit expressed by $R_3SiO_{1/2}$ are particularly preferably alkenyl groups.

In the formula, (o+r) is a positive integer, p is 0 or a positive integer, q is 0 or a positive integer, s is 0 or a positive integer, p/(o+r) is a number within a range of 0 to 10, q/(o+r) is a number within a range of 0 to 5, (o+r)/(o+p+q+r) is a number within a range of 0.3 to 0.9, and s/(o+p+q+r) is a number within a range of 0 to 0.4.

As the component (a2), the alkenyl group-containing MQ organopolysiloxane resin represented below is particularly preferably exemplified.

$$\{(Alk)R^2_2SiO_{1/2}\}q1(R^2_3SiO_{1/2})q2(SiO_{4/2})r$$

(in the formula, Alk and $R^2$ are the same groups as described above, while q1+q2+r is a number within the range of 50 to 500, (q1+q2)/r is a number within the range of 0.1 to 2.0, and q2 is the number within the range in which the content of vinyl (CH2=CH—) groups in the organopolysiloxane resin satisfies the range of 1.0 to 5.0 mass %.)

Using component (a1) with an alkenyl group only at an end of the molecular chain and component (a2) as an organopolysiloxane resin, having a certain number of alkenyl groups can provide a curing reaction product with excellent curability as an entire composition and having excellent flexibility and mechanical strength, and can provide an organopolysiloxane cured film that is particularly suitable for an adhesive layer or dielectric layer in the aforementioned electronic components and the like.

Component (B) is an organohydrogenpolysiloxane having at least two silicon-bonded hydrogen atoms in a molecule and is a component that functions as a crosslinking agent for component (A).

Examples of component (B) include 1,1,3-3-tetramethyl-disiloxane, 1,3,5,7-tetramethyl cyclotetrasiloxane, tris(dimethylhydrogensiloxy)methylsilane, tris(dimethylhydrogensiloxy)phenylsilane, methylhydrogenpolysiloxanes blocked at both ends of a molecular chain with a trimethylsiloxy group, dimethylsiloxane/methylhydrogensiloxane copolymers blocked at both ends of a molecular chain with a trimethylsiloxy group, dimethylpolysiloxane blocked at both ends of a molecular chain with a dimethylhydrogensiloxane group, dimethylsiloxane/methylhydrogensiloxane copolymers blocked at both ends of a molecular chain with a dimethylhydrogensiloxane group, methylhydrogensiloxane/diphenylsiloxane copolymers blocked at both ends of a molecular chain with a trimethylsiloxy group, methylhydrogensiloxane/diphenylsiloxane/dimethylsiloxane copolymers blocked at both ends of a molecular chain with a trimethylsiloxy group, hydrolytic condensates of a trimethylsilane, copolymers containing $(CH_3)_2HSiO_{1/2}$ units and $SiO_{4/2}$ units, copolymers containing $(CH_3)_2HSiO_{1/2}$ units, $SiO_{4/2}$ units, and $(C_6H_5)SiO_{3/2}$ units, and mixtures of two or more types thereof.

The amount of component (B) used is preferably an amount where the silicon-bonded hydrogen atoms are within a range of 0.1 to 10 mols, more preferably 0.5 to 2.5 mols, and particularly preferably 0.5 to 2.0 mols, with regard to 1 mol of carbon-carbon double bonds in component (A) of the composition. Using an amount of component (B) that is less than the lower limit may cause curing defects. When the amount of component (B) exceeds the upper limit, the mechanical strength of the cured product may be too high and the preferred physical properties of an electrode layer, dielectric layer or adhesive layer may not be obtainable. However, in order to improve the adhesive strength of the organopolysiloxane cured film according to the present invention to glass or other adherend or the like, use of silicon-bonded hydrogen atoms in a range exceeding 20 mols with regard to 1 mol of carbon-carbon double bonds in component (A) is not hindered.

The laminated organopolysiloxane cured films according to the present invention preferably have mutually different compositions, and structures chemically bonded at an interface thereof by a hydrosilylation reaction between the aforementioned component (A) and component (B). Herein, the reaction between components (A) and (B) at the interface is favorably advanced when the number of silicon atom-bonded hydrogen atoms in an organohydrogenpolysiloxane component with regard to a total of one mol of carbon-carbon double bonds in the cured film or curable composition forming the film at the interface of the two cured films or precursors thereof (including uncured/semi-cured coating states) (hereinafter referred to as "SiH/Vi ratio") are different. Conversely, if the SiH/Vi ratio of the two are equal, the reaction between the curable reactive functional groups at the interfaces is not promoted, and sufficient chemical bonds may not be formed.

Preferably, when curable organopolysiloxane compositions (I) and (II) having different compositions are used, the SiH/Vi ratio in composition (I) is more than 1.0 mol and 2.0 mols or less (i.e., SiH excess) and the SiH/Vi ratio in the other composition (II) is 0.5 mols or more and 1.0 mol or less (i.e., SiH deficient). Therefore, a reaction between common curing reactive functional groups is promoted between the interfaces of the cured films obtained by curing both compositions, and a strong chemical bond is formed. Note that regarding the SiH/Vi ratio of compositions (I) and (II), the value of $[SiH/Vi]_{II}/[SiH/Vi]_I$ is preferably within a range of 0.33 to 0.85, and particularly preferably within a range of 0.50 to 0.75 and 0.58 to 0.67. Note that the composition (I) with excess SiH may be a dielectric layer and the composition (II) with insufficient SiH may be an electrode layer, or vice versa (composition (I): electrode layer, composition (II): dielectric layer), and are not particularly limited.

Note that the present invention preferably has a strong chemical bond formed between the organopolysiloxane cured films serving as an electrode layer and dielectric layer; therefore, if composition (I) above provides the dielectric layer and composition (II) provides the electrode layer, the difference in compositional surface is determined by the presence or absence of electrically conductive microparticles in addition to the SiH/Vi ratio. Specifically, composition (II) forming the electrode layer contains electrically conductive microparticles and the SiH/Vi ratio thereof ($[SiH/Vi]_{Elec}$) 0.5 mols or more and 1.0 mol or less, preferably 0.6 mols or more and 0.9 mols or less, more preferably 0.7 mols or more and 0.8 mols or less. Furthermore, the composition (I) forming the dielectric layer does not contain electrically conductive microparticles, and for the SiH/Vi ratio thereof ($[SiH/Vi]_{DEAP}$), values of $[SiH/Vi]_{Elec}/[SiH/Vi]_{DEAP}$ are particularly preferably within a range of 0.33 to 0.85, 0.50 to 0.75, and 0.58 to 0.67. In other words, combinations in which the compositions forming the dielectric layer have some SiH excess are particularly preferable.

Component (C) is a catalyst that promotes a hydrosilylation reaction between component (A) and component (B). Examples include platinum based catalysts, rhodium based catalysts, palladium based catalysts, nickel based catalysts, iridium based catalysts, ruthenium based catalysts, and iron based catalysts. Platinum based catalysts are preferable. Exemplary platinum-based catalysts include platinum fine powder, chloroplatinic acid, an alcohol solution of chloroplatinic acid, a platinum-alkenyl siloxane complex, a platinum-olefin complex, a platinum-carbonyl complex, and a catalyst in which these platinum-based catalysts are dispersed or encapsulated with a thermoplastic resin such as silicone resin, polycarbonate resin, acrylic resin, or the like, with a platinum-alkenyl siloxane complex particularly preferable. In particular, a 1,3-divinyl-1,1,3,3-tetramethyldisiloxane complex of platinum is preferred, and is preferably added in the form of an alkenylsiloxane solution of the complex. In addition, in terms of improving the handleability as well as the pot life of the composition, a platinum containing hydrosilylation reaction catalyst in microparticles dispersed and encapsulated with thermoplastic resin may be used. As the catalyst for promoting the hydrosilylation reaction, a non-platinum based metal catalyst such as iron, ruthenium, iron/cobalt, or the like may be used.

Furthermore, a hydrosilylation reaction catalyst, which is component (C), is a hydrosilylation reaction catalyst which does not exhibit activity without irradiation with a high energy beam, but exhibits activity in the composition by irradiation with a high energy beam, or is a so-called a high energy beam activation catalyst or photoactivation catalyst. By using such a component (C), the composition as a whole can be cured even at low temperatures triggered by irradiation with a high energy beam, has excellent storage stability, and facilitates reaction control; thus, the properties of excellent handling workability can be achieved.

Examples of high energy beams include ultraviolet rays, gamma rays, X-rays, alpha rays, electron beams, and the like. In particular, examples include ultraviolet rays, X-rays, and electron beams irradiated from a commercially available electron beam irradiating device. Of these, ultraviolet rays are preferable from the perspective of efficiency of catalyst activation, and ultraviolet rays within a wavelength range of 280 to 380 nm are preferable from the perspective of industrial use. Furthermore, the amount of irradiation varies depending on the type of high energy beam activated catalyst, but in the case of ultraviolet rays, the integrated amount of irradiation at a wavelength of 365 nm is preferably within a range of 100 mJ/cm$^2$ to 100 J/cm$^2$.

Specific examples of component (C) include (methylcyclopentadienyl) trimethyl platinum (IV), (cyclopentadienyl) trimethyl platinum (IV), (1,2,3,4,5-pentamethyl cyclopentadienyl) trimethyl platinum (IV), (cyclopentadienyl) dimethylethyl platinum (IV), (cyclopentadienyl) dimethylacetyl platinum (IV), (trimethylsilyl cyclopentadienyl) trimethyl platinum (IV), (methoxycarbonyl cyclopentadienyl) trimethyl platinum (IV), (dimethylsilyl cyclopentadienyl) trimethylcyclopentadienyl platinum (IV), trimethyl (acetylacetonato) platinum (IV), trimethyl (3,5-heptanedionate) platinum (IV), trimethyl (methylacetoacetate) platinum (IV), bis(2,4-pentanedionato) platinum (II), bis(2,4-hexanedionato) platinum (II), bis(2,4-heptanedionato) platinum (II), bis(3,5-heptanedionato) platinum (II), bis(1-phenyl-1, 3-butanedionato) platinum (II), bis(1,3-diphenyl-1,3-propanedionato) platinum (II), and bis(hexafluoroacetylacetonato) platinum (II). Of these, (methylcyclopentadienyl) trimethyl platinum (IV) and bis(2,4-pentanedionato) platinum (II) are preferred from the perspective of versatility and ease of acquisition.

The amount of component (C) used is an effective amount and is not particularly limited so long as the amount promotes curing of the curable organopolysiloxane composition of the present invention. Specifically, in mass units, metal atoms in the catalyst are of an amount within a mass unit range of 0.01 to 1,000 ppm, and preferably, the platinum metal atoms in component (C) are of an amount within a range of 0.1 to 500 ppm, with regard to the sum (100 mass % as a whole) of components (A) to (C). This is because when the amount of component (C) is less than the lower limit of the aforementioned range, curing may be insufficient. Moreover, exceeding the upper limit of the range may be uneconomical and potentially adversely affect transparency, such as by coloring of the obtained cured product and the like.

[Use of Functional Filler and Function of Cured Film]

In the present invention, the laminated organopolysiloxane cured films are organopolysiloxane cured films obtained by curing curable organopolysiloxane compositions with mutually different compositions, and a functional filler is preferably added to achieve this function. In particular, the composition of the organopolysiloxane cured film serving as a dielectric layer is very different from the organopolysiloxane cured film serving as an electrode layer, not only because of the difference in the preferred SiH/Vi ratio described above but also because the composition does not contain electrically conductive microparticles. In general, the curable organopolysiloxane composition that provides the cured film serving as an electrode layer preferably contains (E) electrically conductive microparticles, and the cured organopolysiloxane composition that provides the cured film serving as a dielectric layer preferably contains (F) a reinforcing filler and may optionally introduce additional high dielectric functional groups without containing electrically conductive microparticles. Note that the functional filler may be surface treated for hydrophobicity. Examples of a hydrophobic surface treating agent include at least one surface treating agent selected from the group consisting of organic titanium compounds, organic silicon compounds, organic zirconium compounds, organic aluminum compounds, and organic phosphorus compounds.

[(E) Electrically Conductive Microparticles]

The electrically conductive microparticles are not particularly limited so long as electrical conductivity can be imparted to the organopolysiloxane cured film, and a cured film containing the electrically conductive microparticles can be preferably used as an electrode layer. Note that WO2014/105959 and the like by the present applicants propose, for example, an electrode layer containing electrically conductive microparticles.

Specific examples thereof include: electrically conductive carbon black, graphite, vapor phase growth carbon (VGCF), and other electrically conductive carbons; and metal powders of platinum, gold, silver, copper, nickel, tin, zinc, iron, aluminum, and the like. Further examples include: antimony-doped tin oxide, phosphorous-doped tin oxide, needle shaped titanium oxide coated on the surface with tin oxide/antimony, tin oxide, indium oxide, antimony oxide, zinc antimonate, and pigments obtained by coating a whisker surface of carbon or graphite with tin oxide or the like; pigments obtained by coating at least one type of conductive metal oxide selected from a group consisting of tin-doped indium oxide (ITO), fluorine-doped tin oxide (FTO), phosphorous-doped tin oxide, and nickel oxide; pigments having conductivity containing tin oxide and phosphorus on the surface of titanium dioxide particles; and the like. These may be treated with the various surface treating agents described later. These may be used independently or two or more may be used in combination. Furthermore, in order to uniformly disperse these electrically conductive microparticles in the curable organopolysiloxane composition, the electrically conductive microparticles may be pre-mixed with some or all of component (A) or component (B) used in the composition and blended in the curable organopolysiloxane composition in the form of a compound.

Furthermore, the conductive inorganic fine particles may be obtained by coating a conductive material such as a metal or the like on the surface of fibers such as glass fibers, silica alumina fibers, alumina fibers, carbon fibers, and the like, needle shaped reinforcing materials such as aluminum borate whiskers, potassium titanate whiskers, and the like, or inorganic filling materials such as glass beads, talc, mica, graphite, wollastonite, dolomite, and the like.

[(F) Reinforcing Filling Material]

The curable organopolysiloxane composition providing a cured film serving as a dielectric layer preferably contains reinforcing microparticles or composites thereof, which are surface treated with one or more types of organic silicon compounds, and have different average BET specific surface areas, within a certain range relative to the sum of components to form a non-volatile solid fraction by a curing reaction in the composition.

Herein, from the perspective of the mechanical strength of the cured product, the reinforcing microparticles are preferably one or more types of reinforcing inorganic microparticles having an average primary particle size of less than 50 nm. Examples include fumed silica, wet silica, pulverized silica, calcium carbonate, diatomaceous earth, finely pulverized quartz, various metal oxide powders other than alumina and zinc oxides, glass fibers, carbon fibers, and the like, and those treated with one or more types of organic silicon compounds described below are used. The shape thereof is not particularly limited, with arbitrary shapes including a particle shape, plate shape, needle shape, fibrous shape, and the like capable of being used.

Preferred examples thereof include: hydrophilic or hydrophobic fumed silica or metal oxide composites thereof, which have an average primary particle size that is 10 nm or less, are partially aggregated, and have BET specific surface areas that are mutually different as described later, from the perspective of improving the mechanical strength of the dielectric layer. Furthermore, in terms of improving dispersibility, the fumed silica or metal oxide composite thereof is preferably treated with silazane or a silane coupling agent described later. Two or more types of the reinforcing inorganic particles may be used in combination.

In the present invention, the reinforcing filling material used in the dielectric layer contains: (F1) reinforcing microparticles or a composite thereof having an average BET specific surface area exceeding 100 $m^2/g$, which have been surface treated with one or more type of organic silicon compounds; and (F2) reinforcing microparticles or a composite thereof having an average BET specific surface area within a range of 10 to 100 $m^2/g$, which have been surface treated with one or more type of organic silicon compounds; where the mass ratio of component (F1) and component (F2) is within a range of 50:50 to 99:1, may be within a range of 70:30 to 97:3, and preferably is within a range of 70:30 to 95:5.

If the mass ratio is out of the range, the viscosity of the curable organopolysiloxane composition before curing may increase, and the mechanical strength and dielectric breakdown strength after curing may decrease.

When reinforcing filling materials, which are the aforementioned components (F1) and (F2), are added into the composition, the dynamic strength and dielectric breakdown strength of the organopolysiloxane cured product obtained by curing the curable organopolysiloxane composition according to the present invention can be increased. The added amount of these filling materials is within a range of 10 to 40 mass %, may be within a range of 15 to 35 mass %, and is particularly preferably within a range of 15 to 30 mass %, relative to the sum of components in the composition, which form a non-volatile solid fraction by a curing reaction, as the sum of component (D1) and component (D2). If the upper limit of the aforementioned mass percentage range is exceeded, a uniform and thin film coating may be difficult, while if the mass percentage is less than the lower limit of the aforementioned mass percentage range, the physical properties of the curable organopolysiloxane composition after curing may be insufficient.

The reinforcing filling materials, which are components (F1) and (F2) described above, are preferably surface treated with one or more type of organic silicon compounds. The surface treatment using the organic silicon compound is a hydrophobizing treatment, and a reinforcing filler surface-treated by the organic silicon compound can be uniformly dispersed in the organopolysiloxane composition at a high filling ratio. Furthermore, an increase in the viscosity of the composition is inhibited, thereby improving moldability.

Examples of organic silicon compounds include: low molecular weight organic silicon compounds such as silanes, silazanes, siloxanes, and the like; and organic silicon polymers or oligomers such as polysiloxanes, polycarbosiloxanes, and the like. The organic silicon compound used for surface treatment most preferably contains at least one or more types selected from hexamethyldisilazane and 1,3-bis (3,3,3-trifluoropropyl)-1,1,3,3-tetramethyldisilazane.

The amount of the surface treating agent with regard to the total amount of the filler in the surface treatment is preferably within a range of 0.1 mass % or more and 50 mass % or less, and more preferably within a range of 0.3 mass % or more and 40 mass % or less. Note that the treatment amount is preferably the feed ratio of fillers to the surface treating agent, with excess treating agents preferably removed following treatment. Furthermore, there is no problem in using additives and the like that promote or assist a reaction when treating if necessary.

In the surface treatment, whether or not the components of the surface treating agent are chemically or physically fixed to the surface of the filler is an important parameter. For example, the fixed amount of the surface treating agent can be analyzed by reacting a composition containing a filler with excess tetraethoxysilane under alkaline conditions, then detecting the reaction product via gas chromatography. The component amount of the surface treating agent fixed to the filler surface described above is preferably 1.0 mass part or more, more preferably 3.0 mass parts or more, relative to 100 mass parts of the filler amount. Of these, when two types of organic silicon compounds used for the surface treatment of components (F1) and (F2) according to the present invention are hexamethyldisilazane and 1,3-bis(3,3,3-trifluoropropyl)-1,1,3,3-tetramethyldisilazane, the ratio of fixation on the filler surface can be changed as needed. For example, in the present invention, a fluoroalkyl group expressed by $(C_pF_{2p+1})$—R— (R represents an alkylene group having 1 to 10 carbon atoms, and p represents an integer of 1 to 8) can be introduced as the high dielectric functional group to a portion or all of component (A) or component (B), as described above. In terms of the dielectric properties, economy, ease of manufacturing, and moldability of the obtained curable organopolysiloxane composition, a group in which p=1, in other words, a trifluoropropyl group, is preferable. In this case, the weight ratio of the treatment components derived from hexamethyldisilazane and 1,3-bis (3,3,3-trifluoropropyl)-1,1,3,3-tetramethyldisilazane fixed to the filler surface is between 0 and 10, preferably between 0 and 5. When outside of this range, the affinity between component (A) or component (B) and the filler surface may be inferior, and thus the processability and physical properties after curing may be reduced.

[Other Functional Filling Materials]

In the curable organopolysiloxane compositions according to the present invention, other filling materials may or may not be used as desired, with examples including highly dielectric fillers, thermally conductive inorganic particles, insulating fillers, and the like. The inorganic microparticles may have two or more functions, such as a reinforcing filling material function or the like.

Examples of preferred dielectric inorganic fine particles include one or more inorganic fine particles selected from a group consisting of composite metal oxides in which a portion of barium and titanium sites of titanium oxide, barium titanate, strontium titanate, lead zirconate titanate, and barium titanate is substituted with calcium, strontium, yttrium, neodymium, samarium, dysprosium, or other alkaline earth metal, zirconium, or rare earth metals. Titanium oxide, barium titanate, zirconate titanate barium calcium, and strontium titanate are more preferable, with titanium oxide and barium titanate even more preferable. Specifically, at least a portion of the dielectric inorganic fine particles are particularly preferably dielectric inorganic fine particles with a specific dielectric constant at room temperature at 1 kHz of 10 or more. Note that the upper limit of the preferable size (average primary particle size) of the inorganic fine particles is 20,000 nm (20 μm), but more preferably 10,000 nm (10 μm), taking into consideration the processability into a thin film for a transducer described later. Using the dielectric inorganic fine particles may further improve the mechanical properties and/or the electrical properties, particularly the specific dielectric constant, of the organopolysiloxane cured product.

Insulating inorganic fine particles that can used in the present invention are not limited so long as the insulating inorganic materials are generally known, in other words, particles of inorganic materials having a volume resistivity of $10^{10}$ to $10^{18}$ Ω·cm. The shape thereof can be any shape such as a particle shape, flake shape, or fiber shape (including whiskers). Specific examples thereof include ceramic spherical particles, plate shaped particles, and fibers. Preferably used examples thereof include metal silicates such as alumina, iron oxide, copper oxide, mica, talc, and the like, and particles such as quartz, amorphous silica, glass, and the like. Furthermore, these may be treated with various surface treating agents described later. These may be used independently or two or more may be used in combination. When the insulating inorganic fine particles are added to the composition, the dynamic strength and dielectric breakdown strength of the organopolysiloxane cured product can be increased, with an increase in the specific dielectric constant also potentially being observed.

Examples of thermally conductive inorganic fine particles that can be used in the present invention include: metal oxide particles such as magnesium oxide, zinc oxide, nickel oxide, vanadium oxide, copper oxide, iron oxide, silver oxide, and the like; and inorganic compound particles such as aluminum nitride, boron nitride, silicon carbide, silicon nitride, boron carbide, titanium carbide, diamond, diamond-like carbon, and the like. Zinc oxide, boron nitride, silicon carbide, and silicon nitride are preferable. When one or more of the thermally conductive inorganic fine particles is added to the composition, the thermal conductivity of the organopolysiloxane cured product can be increased.

The average particle size of the inorganic particles can be measured by a normal measurement method that is used in the field. For example, if the average particle size is approximately 50 nm or larger and 500 nm or less, the particle size is measured by observation using a microscope such as a transmission type electron microscope (TEM), a field emission type transmission electron microscope (FE-TEM), a scanning type electron microscope (SEM), a field emission type scanning electron microscope (FE-SEM), or the like, allowing the average value to be obtained as a measure of the average primary particle size. Meanwhile, if the average particle size is approximately 500 nm or more, the value of the average primary particle size can be directly obtained using a laser diffraction/scattering type particle size distribution measuring device or the like.

[Use of Solvent]

The curable organopolysiloxane composition according to the present invention can be subjected to a curing reaction as is; however, when the composition or a portion of components thereof (for example, organopolysiloxane) is a solid or a viscous liquid, an organic solvent can be used if necessary in order to improve the miscibility and handling properties. Specifically, when the curable organopolysiloxane composition of the present invention is applied in the form of a film, the viscosity may be adjusted using a solvent within a range in which the overall viscosity is 100 to 50,000 mPa·s, and when diluted with a solvent, use is possible within a range of 0 to 2000 mass parts with regard to the sum (100 mass parts) of components (A) to (C). In other words, in the composition of the present invention, the solvent may be 0 mass parts and the composition is preferably a solvent-free type. In particular, by selecting a polymer with a low degree of polymerization for the curable organopolysiloxane composition of the present invention, a solvent-free design is possible, with no residue of a fluorinated solvent, organic solvent, or the like remaining in the film obtained after curing, which has the advantage of eliminating problems in terms of environmental impact and the effects of the solvent on electronic devices. Furthermore, a low-solvent type composition may be used and is preferably of an amount such that the amount of the solvent used is 10 mass parts or less, and preferably 5 mass parts or less, relative to the sum (100 mass parts) of the aforementioned components (A) to (C). Furthermore, in particular, the composition used in the electrode layer may be diluted with a solvent and applied in a thin film by spray application, as in the Embodiments described below.

Preferably used examples of these organic solvents include one or more types of organic solvents selected from (E1) organic polar solvents, (E2) low molecular weight siloxane solvents, and (E3) halogen solvents, or mixed solvents thereof with a boiling point of 80° C. or higher and less than 200° C. Note that the solvent may be a mixed solvent of different organic solvents of different or same type at an arbitrary ratio. Preferably, the organic solvents described contain at least one type of low molecular weight siloxane solvent selected from hexamethyldisiloxane, octamethyltrisiloxane, and mixtures thereof, which are commercially available from Dow Silicones Corporation under the names OST-10, OST-20, and OST-2. Furthermore, when the fluoroalkyl group content in the curable elastomer composition is high, the optional use of these low molecular weight siloxane solvents together with the halogen solvents described above is also included in a preferable form of the present invention.

[Overall Viscosity]

The total viscosity of the curable organopolysiloxane composition used in the present invention measured at 25° C. and a shear rate of 10.0 (S$^{-1}$) is preferably within a range of 5 to 500,000 mPa·s, and particularly preferably within a range of 1,000 to 10,000 mPa·s. In order to achieve the preferred viscosity range, although the amount of the organic solvent used can be adjusted, the composition can be a low-solvent type or solvent-free (solvent-free type). Note that the composition used in the electrode layer may be and is preferably diluted with a solvent and applied in a thin film by spray application, as in the embodiments described below.

[Thixotropic Ratio]

The curable organopolysiloxane composition of the present invention preferably has excellent flowability and does not exhibit thixotropic behavior. This makes it possible to achieve properties with low overall viscosity and excellent uniformity of application. Specifically, the thixotropic ratio, which is a ratio of the viscosity of the entire composition measured at a shear rate of 0.1 (S$^{-1}$) to the viscosity of the entire composition measured at a shear rate of 10.0 (S$^{-1}$) (S$^{-1}$), of the composition is particularly preferably 10.0 or less.

[Solid Fraction Amount]

In the curable organopolysiloxane composition according to the present invention, the content of the component that cures to form an organopolysiloxane cured product, which is a non-volatile solid fraction (in the present invention, simply referred to as the "solid fraction"), is preferably within a range of 5 to 100 mass %, more preferably within the range of 50 to 100 mass %, 75 to 100 mass %, or 85 to 100 mass % of the overall composition.

[Introduction of Dielectric Functional Group]

When the organopolysiloxane cured film according to the present invention is used as an electroactive film (for example, a dielectric film) used in a transducer such as an actuator or the like, a high dielectric functional group may be introduced to the cured product. However, even an organopolysiloxane cured film that does not contain a high dielectric functional group can be used as an electroactive film. Note that WO2014/105959 and the like by the present applicants propose, for example, introducing high dielectric functional groups and improving the specific dielectric constant.

Introduction of a high dielectric functional group can be performed by using an organopolysiloxane or organohydrogenpolysiloxane having a high dielectric functional group as a portion or all of component (A) or component (B), or by adding an organic additive having a high dielectric functional group, a non-reactive organosilicon compound having a high dielectric functional group, or the like to the curable composition. From the perspective of improving miscibility with the curable composition and the specific dielectric constant of the cured product, 10 mol % or more, preferably 20 mol % or more, and more preferably 40 mol % or more of all substitution groups on silicon atoms in the organopolysiloxane or organohydrogenpolysiloxane, which are component (A) or component (B), are substituted by a high dielectric functional group.

The type of the high dielectric functional group introduced to the organopolysiloxane cured film is not particularly limited, and examples include: a) halogen atoms and groups containing a halogen atom as represented by 3,3,3=trifluoropropyl groups and the like; b) groups containing a nitrogen atom as represented by cyanopropyl groups and the like; c) groups containing an oxygen atom as represented by carbonyl groups and the like; d) heterocyclic groups such as imidazole groups and the like; e) groups containing a boron atom such as borate ester groups and the like; f) groups containing phosphorus such as phosphine groups and the like; and g) groups containing a sulfur atom such as thiol groups and the like. Halogen atoms including a fluorine atom and groups containing only a halogen atom are preferably used.

In the present invention, a fluoroalkyl group expressed by $(C_pF_{2p+1})$—R— (R represents an alkylene group having 1 to 10 carbon atoms, and p represents an integer of 1 to 8) is preferably introduced as the high dielectric functional group to a portion or all of component (A) or component (B). The fluoroalkyl group provides a product having an excellent specific dielectric constant, in addition to providing a cured product with excellent transparency because of the components having a fluoroalkyl atom, which improves the compatibility of the components. Specific examples of the fluoroalkyl group include trifluoropropyl groups, pentafluorobutyl groups, heptafluoropentyl groups, nonafluorohexyl groups, undecafluoroheptyl groups, tridecafluorooctyl groups, pentadecafluorononyl groups, and heptadecafluorodecyl groups. Of these, in terms of the dielectric properties, economy, ease of manufacturing, and moldability of the obtained curable organopolysiloxane composition, a group in which p=1, in other words, a trifluoropropyl group, is preferable.

In addition to the aforementioned components, other components may be added, if necessary, to the curable organopolysiloxane composition according to the present invention so long as the object of the present invention is not impaired. Examples of other components include hydrosilylation reaction inhibitors, mold release agents, insulating additives, adhesion improving agents, heat resistance improving agents, fillers, pigments, and various other conventionally known additives. Specific examples include those proposed in the aforementioned WO2014/105959.

The curable organopolysiloxane composition of the present invention can be prepared by uniformly mixing a curable organopolysiloxane and a component promoting a curing reaction, preferably components (A) to (C), and by adding and uniformly mixing another optional component if necessary. Mixing at ambient temperature may be performed using various stirrers or kneaders. Mixing under heat may be performed when combining components that are not cured during mixing.

So long as curing does not occur during mixing, the adding order of the components is not particularly limited. When not used immediately after mixing, a crosslinking agent (for example, component (B)) and a curing reaction promoting component (for example, component (C)) may be stored separately in a plurality of containers so as to not be present in the same container, with the components in all containers capable of being mixed immediately prior to use.

The curing reaction of the curable organopolysiloxane composition according to the present invention proceeds at room temperature for a curing reaction based on condensation reactions such as dehydration, de-alcoholization, and the like. However, when an organopolysiloxane cured film is produced by an industrial production process, the curing reaction is normally achieved by heating the composition or exposing the composition to active energy rays. The curing reaction temperature by heating is not particularly limited, but is preferably 50° C. or higher and 200° C. or lower, more preferably 60° C. or higher and 200° C. or lower, and even more preferably 80° C. or higher and 180° C. or lower. Furthermore, the time for the curing reaction is dependent on the structure of the aforementioned components (A), (B), and (C) and is normally 1 second or more and 3 hours or less. Generally, the cured product can be obtained by being maintained within a range of 90 to 180° C. for 10 seconds to 30 minutes. Note that the film manufacturing method will be described later.

Examples of active energy rays that may be used in the curing reaction include ultraviolet rays, electron beams, radiation, and the like. Ultraviolet rays are preferable in terms of practicality. If the curing reaction is performed using ultraviolet rays, a catalyst for the hydrosilylation reaction having high activity to ultraviolet rays is used, for example, a bis(2,4-pentanedionato)platinum complex or a (methylcyclopentadienyl)trimethylplatinum complex is preferably added. The ultraviolet ray generating source is preferably a high pressure mercury lamp, a medium pressure mercury lamp, an Xe—Hg lamp, a deep UV lamp, or the like. The irradiation amount in this case is preferably 100 to 8,000 mJ/cm$^2$.

[Laminate Body Manufacturing Method]

According to the present invention, the laminate body having a structure with two or more laminated organopolysiloxane cured films with different compositions, wherein the laminated organopolysiloxane cured films have structures chemically bonded at an interface thereof, can be obtained by a method of manufacturing the laminate body, including: step I: a step of curing one type of curable organopolysiloxane composition of two or more curable organopolysiloxane compositions with different compositions, in which at least a portion of functional groups involved in a curing reaction are the same into a film shape to obtain an organopolysiloxane cured film; and step II: a step of coating a curable organopolysiloxane composition different from step I into a film shape onto the organopolysiloxane cured film of step I or a precursor thereof at the same time as step I or after step I and then advancing a curing reaction to laminate a different organopolysiloxane cured film on the organopolysiloxane cured film of step I.

Herein, the organopolysiloxane cured film of step I above is preferably a dielectric layer, and the organopolysiloxane cured film of step II above is preferably an electrode layer, or vice versa.

Examples of methods of coating the curable organopolysiloxane composition into a film in step I or step II can be, without limitation, gravure coating, offset coating, offset gravure, roll coating using an offset transfer roll coater or the like, reverse roll coating, air knife coating, curtain coating using a curtain flow coater or the like, comma coating, Meyer bar, or other conventionally known methods used for the purpose of forming a cured layer.

Furthermore, a plurality of layers of the curable organopolysiloxane composition of the present invention can be applied.

In the laminate body according to the present invention, the laminated organopolysiloxane cured films have a structure chemically bonded at an interface thereof. The structure is formed by bringing the organopolysiloxane cured films after curing or before curing, or thin films of the curable organopolysiloxane composition in an uncured or semi-cured state, serving as precursors thereof (state before completely curing), into contact with each other, and then completely curing using heat or other means to advance a reaction between curing reactive groups at an interface between the cured films. The process may be carried out by laminating in a layer-by-layer manner by advancing a curing reaction from the perspective of industrial production and production efficiency, or a plurality of curing reactive thin layers of the curable organopolysiloxane compositions may be pre-laminated and then completely cured as a whole using heat or other means.

Preferably, an example of the method of manufacturing the laminate body is a method wherein the aforementioned step II includes a step of coating a curable organopolysiloxane composition different from step I into a film shape, further laminating another organopolysiloxane cured film or precursor thereof, in a condition with a coating layer of the curable organopolysiloxane composition in an uncured or semi-cured state, onto the coating layer, optionally repeating the same step two or more times to form a laminated body in which one or more coating layer of the uncured or semi-cured curable organopolysiloxane composition is laminated with the organopolysiloxane cured film or precursor thereof, and then completely advancing the curing reaction on the coating layer of the curable organopolysiloxane composition different from step I to laminate a different organopolysiloxane cured film on the organopolysiloxane cured film of step I. In this case, for example, the curable organopolysiloxane composition containing electrically conductive microparticles is coated into a film onto the organopolysiloxane cured film serving as a dielectric layer, and while this composition is in an uncured or semi-cured state, the organopolysiloxane cured film serving as a dielectric layer is further laminated. A laminate body precursor is formed by repeating the following procedure:

Dielectric layer (cured film)/uncured or semi-cured electrode layer/dielectric layer (cured film)/uncured or semi-cured electrode layer/ . . .

Thereafter, the entire laminate body is cured by heating or the like, such that the cured dielectric layer and electrode layer are alternately laminated to obtain a laminate body with the interface of both layers chemically bonded together.

The manufacturing method is particularly useful as a method for forming an electrode layer in a transducer member, and can industrially easily provide a laminate body, electronic component, or display device member, in which the dielectric layer and electrode layer are firmly joined and peeling or defect problems due to lack of adhesive strength and trackability are less likely to occur.

The laminate body of organopolysiloxane cured films according to the present invention is useful as an electronic material, a member for a displaying device, and a member for a transducer (including sensors, speakers, actuators, and generators), and can be particularly preferably used as an electroactive film (including high dielectric films) provided with an electrode layer, an electronic component or a member for a displaying device. Furthermore, as described above, an electroactive film with high dielectric breakdown strength is preferred in actuators and other transducer members in the form of a single layer or a laminated film and is particularly useful in applications for an actuator activated under high voltage due to having a structure in which the electrode layers are tightly joined together.

EMBODIMENTS

The present invention will be described below by way of examples; however, the present invention is not limited thereto. The following compounds were used in the Examples and Comparative Example described below. The physical properties of each cured film were measured by the following methods.

[Shore A Hardness]

Cured films were prepared by heating each curable organopolysiloxane composition for 1 hour at a curing temperature of 150° C. for the cured film serving as an electrode layer (ELEC) and 110° C. for the cured film serving as a dielectric layer (DEAR). Note that the thickness of the cured sample was approximately 6 mm. The resulting cured films were each measured for Shore A hardness using DD2 (manufactured by KOBUNSHI KEIKI CO., LTD.) by a method in accordance with a JIS K 6249. The results are shown in Table 1. Note that cases of insufficient curing or excessive softness were considered "not measurable" for various reasons.

[Elastic Modulus]

The elastic modulus of each curable organopolysiloxane composition providing the electrode layer was measured with a viscoelasticity measuring device (manufactured by Anton Paar, model number: MCR302). A Peltier element temperature control system and a 15 mm diameter parallel plate were used to set the sample to a thickness of 500 μm. The temperature was increased from 25° C. to 120° C. over 2.8 minutes and then maintained at 120° C. to perform curing. The storage elastic modulus (G') after 60 minutes from the start of the temperature increase is shown in Table 1 as the elastic modulus.

[Volume Resistivity Measurement]

The measuring device Lorestar GP (manufactured by Mitsubishi Chemical Analytech Co., Ltd.) was used for measurements at room temperature. PSP (manufactured by Mitsubishi Chemical Analytech Co., Ltd.) was used in the probe. As described below, measurements were taken on at least 14 electrode layers prepared on the organopolysiloxane cured film serving as a dielectric layer, and Table 1 shows the average value of the stable numerical values read and the value calculated using the electrode thickness and the correction coefficient.

Component (a1): Dimethylsiloxane polymer (amount of vinyl groups (mass %): 0.24 mass %, siloxane polymerization degree: 300) blocked at both ends with a vinyldimethylsiloxy group Component (a2): 3,3,3-trifluoropropylmethyl, dimethylsiloxane copolymer (amount of vinyl groups: 0.26 mass %, siloxane polymerization degree: 193) blocked at both ends with a vinyldimethylsiloxy group Component (b1): Dimethylsiloxy-methylhydrosiloxy-siloxane copolymer blocked at both ends by a trimethylsiloxy group (amount of silicon atom-bonded hydrogen: 0.71 mass %)

Component (b2): Dimethylsiloxane polymer blocked at both ends by a dimethyhydrosiloxy group (amount of silicon-bonded water: 0.02 mass %)

Component (b3): Dimethylsiloxane/3,3,3-trifluoropropylmethylsiloxane/methylhydrogen siloxane copolymer blocked at both ends by a trimethylsiloxy group (amount of silicon-bonded hydrogens: approximately 0.23 mass %)

Component (b4): Dimethylsiloxane/3,3,3-trifluoropropylmethylsiloxane copolymer blocked at both ends by a dimethyhydrosiloxy group (amount of silicon-bonded hydrogens: approximately 0.014 mass %)

Component (c1): Dimethyl siloxane polymer solution blocked at both ends by a vinyldimethylsiloxy group of a platinum-1,3-divinyl 1,1,3,3-tetramethyldisiloxane complex (approximately 0.6 mass % % in platinum concentration)

Component (d): Acetylene black (manufactured by DENKA COMPANY LIMITED, 100% pressed product)

Component (e1): Fumed silica treated with hexamethyldisilazane and 1,3-bis(3,3,3-trifluoropropyl)-1,1,3,3-tetramethyldisilazane (product name prior to treatment: AEROSIL® 200, BET specific surface area: 200 m²/g)

Component (e2): Fumed silica treated with hexamethyldisilazane and 1,3-bis(3,3,3-trifluoropropyl)-1,1,3,3-tetramethyldisilazane (product name prior to treatment: AEROSIL® 50, BET specific surface area: 50 m²/g)

Component (e3): Fumed silica treated with hexamethyldisilazane (product name before treatment: AEROSIL® 200, BET specific surface area: 200 m²/g)

Component (e4): Fumed silica treated with hexamethyldisilazane (product name before treatment: AEROSIL® 50, BET specific surface area: 50 m²/g)

Component (f1): 1-ethynyl-1-cyclohexanol

Component (f2): 1,3,5,7-tetramethyl-1,3,5,7-tetravinyl-cyclotetrasiloxane

Curable Organopolysiloxane Compositions Providing Electrode Layers According to Embodiments 1 to 3 and Comparative Examples 1 to 7

As liquid curable organopolysiloxane compositions, each of the above components was blended by weight % as listed in Table 1. In this case, the amount of silicon atom-bonded hydrogen atoms (Si—H) of component (b) per 1 mol of unsaturated hydrocarbon groups in the composition is the amount: $(SiH/Vi)_{ELEC}$ shown in Table 1. In mixing each component, materials other than the catalyst component (c1) were mixed using a planetary centrifugal mixer (product name: ARE-310, manufactured by THINKY CORPORATION), and after component (c1) was added, the mixture was further mixed and prepared under a vacuum using a planetary centrifugal mixer. Various physical properties are also shown in Table 1.

Curable Organopolysiloxane Composition 1 Providing Dielectric Layer According to Embodiments 1 and 3 and Comparative Examples 1 to 7

Use in DEAP Sheet Example 1

A liquid curable organopolysiloxane composition was prepared by adding the aforementioned component (a2), component (b3), component (b4), component (c1), component (e1), component (e2) and component (f2) so as to be 68.34 mass %, 5.06 mass %, 5.06 mass %, 0.10 mass %, 18.69 mass %, 2.46 mass %, and 0.28 mass %, respectively. In this case, silicon atom-bonded hydrogen atoms (Si—H): $(SiH/Vi)_{DEAP}$ of component (b) per 1 mol of unsaturated hydrocarbon groups in the composition were at an amount of approximately 1.2 mols. The hardness of the resulting organopolysiloxane cured product was Shore A 37.

Curable Organopolysiloxane Composition 2 Providing Dielectric Layer According to Embodiment 2

Use in DEAP Sheet Example 2

A liquid curable organopolysiloxane composition was prepared by adding the aforementioned component (a1), component (b1), component (b2), component (c1), component (e3), component (e4) and component (f1) so as to be 70.59 mass %, 0.99 mass %, 3.83 mass %, 0.10 mass %, 20.10 mass %, 4.35 mass %, and 0.04 mass %, respectively. In this case, silicon atom-bonded hydrogen atoms (Si—H):

$(SiH/Vi)_{DEAP}$ of component (b) per 1 mol of unsaturated hydrocarbon groups in the composition were at an amount of approximately 1.2 mols. The hardness of the resulting organopolysiloxane cured product was Shore A 39.

Formation of Dielectric Layer (Film) in Embodiments/Comparative Examples

The curable organopolysiloxane compositions that provide the dielectric layer were coated in a thin film on a PET base material having a release layer (release liner) using a coater and then cured in an oven at 110° C. for 60 minutes to prepare a film with a thickness of 0.1 mm.

Formation of Electrode Layer in the Embodiments/Comparative Examples

The curable organopolysiloxane compositions that provide the electrode layers listed in Table 1 were diluted with a low molecular weight siloxane solvent (OST-20, manufactured by DOW SILICONES CORPORATION) such that the electrode material concentration was 10 weight %. A circular mask was attached to one surface of the dielectric layer (film) with a thickness of 0.1 mm prepared as described above, and a diluted solution was coated by spraying over the mask to form 16 circular electrodes with a diameter of 13.5 mm. After coating, the layer was left at 60° C. and under a vacuum for approximately 12 hours. The PET base material having a release layer (release liner) was then placed over the electrode and pressed at room temperature. The base material PET film was peeled off and then heating was performed at 120° C. for 60 minutes to form 10 to 13 μm thick electrodes.

[Adhesion Evaluation of Dielectric Layer/Electrode Layer: Peel Test]

With the above method, tape (manufactured by NITTO DENKO CORPORATION, product name: NITOFLON (registered trademark) 0.08) was attached to a circular electrode layer formed on one surface of the dielectric layer (film), left at room temperature for 10 minutes, and then peeled off to evaluate the adhesion between the dielectric layer and electrode layer. If the electrode layer is not peeled off with the tape and the electrode layer remains on the dielectric layer (film), it is evaluated as "usable", and if the electrode layer is peeled off with the tape, it is evaluated as "unusable" and entered in Table 1. Note that if the electrode layer is peeled off from the surface of the dielectric layer transferred to the tape side, it is considered that sufficient chemical bonding has not been formed at the interface between the electrode layer and the dielectric layer surface and that adhesion and bonding strength are weak.

TABLE 1

| Component | Embodiment 1 | Embodiment 2 | Embodiment 3 | Comparative Example 1 | Comparative Example 2 | Comparative Example 3 |
|---|---|---|---|---|---|---|
| a1 | 74.75 | 75.68 | 74.75 | 77.57 | 76.62 | 73.84 |
| a2 | | | | | | |
| b1 | 0.90 | 0.79 | 0.90 | 0.58 | 0.69 | 1.00 |
| b2 | 6.98 | 6.16 | 6.98 | 4.48 | 5.32 | 7.78 |
| c1 | 0.10 | 0.10 | 0.10 | 0.10 | 0.10 | 0.10 |
| d | 16.95 | 16.95 | 16.95 | 16.95 | 16.95 | 16.95 |
| f1 | 0.25 | 0.25 | 0.25 | 0.25 | 0.25 | 0.25 |
| f2 | 0.07 | 10.07 | 0.07 | 0.07 | 0.07 | 0.07 |
| Total | 100 | 100 | 100 | 100 | 100 | 100 |
| Component d wt. % | 17 | 17 | 17 | 17 | 17 | 17 |
| $(SiH/Vi)_{ELEC}$ | 0.8 | 0.7 | 0.8 | 0.5 | 0.6 | 0.9 |
| DEAP sheet example | 1 | 1 | 2 | 1 | 1 | 1 |

TABLE 1-continued

| (SiH/Vi)$_{DEAP}$ | 1.2 | 1.2 | 1.2 | 1.2 | 1.2 | 1.2 |
|---|---|---|---|---|---|---|
| (SiH/Vi)$_{ELEC}$/(SiH/Vi)$_{DEAP}$ | 0.67 | 0.58 | 0.67 | 0.42 | 0.50 | 0.75 |
| Shore A$_{DEAP}$ | 37 | 37 | 39 | 37 | 37 | 37 |
| Shore A$_{ELEC}$ | 5 | Too soft to measure | 5 | Too soft to measure | Too soft to measure | 9 |
| G'/Pa | $1.0 \times 10^5$ | $6.3 \times 10^4$ | $1.0 \times 10^5$ | | | $1.7 \times 10^5$ |
| Volume resistivity Ω · cm | $2.8 \times 10^1$ | $1.6 \times 10^1$ | $2.5 \times 10^0$ | | | $2.4 \times 10^1$ |
| Peeling evaluation | | Usable | | | Unusable | |

| | Component | Comparative Example 4 | Comparative Example 5 | Comparative Example 6 | Comparative Example 7 |
|---|---|---|---|---|---|
| | a1 | 72.94 | 70.35 | 67.81 | 67.81 |
| | a2 | | | | 6.88 |
| | b1 | 1.11 | 1.40 | 1.69 | 0.91 |
| | b2 | 8.58 | 10.87 | 13.12 | 7.03 |
| | c1 | 0.10 | 0.10 | 0.10 | 0.10 |
| | d | 16.95 | I16.95 | 16.95 | 16.95 |
| | f1 | 0.25 | 0.25 | 0.25 | 0.25 |
| | f2 | 0.07 | 0.07 | 0.07 | 0.07 |
| | Total | 100 | 100 | 100 | 100 |
| | Component d wt. % | 17 | 17 | 17 | 17 |
| | (SiH/Vi)$_{ELEC}$ | 1.0 | 1.3 | 1.6 | 0.8 |
| | DEAP sheet example | 1 | 1 | 1 | 1 |
| | (SiH/Vi)$_{DEAP}$ | 1.2 | 1.2 | 1.2 | 1.2 |
| | (SiH/Vi)$_{ELEC}$/(SiH/Vi)$_{DEAP}$ | 0.83 | 1.08 | 1.33 | 0.67 |
| | Shore A$_{DEAP}$ | 37 | 37 | 37 | 37 |
| | Shore A$_{ELEC}$ | 19 | 33 | 33 | Not measurable due to insufficient curing |
| | G'/Pa | $3.2 \times 10^5$ | $6.3 \times 10^5$ | $6.6 \times 10^5$ | |
| | Volume resistivity Ω · cm | $1.4 \times 10^1$ | $1.8 \times 10^1$ | $1.6 \times 10^1$ | |
| | Peeling evaluation | | Unusable | | |

The dielectric layer/electrode layer of Embodiments 1 to 3 have a structure in which the electrode layers did not peel off in the peel test and both layers adhered tightly together. On the other hand, in Comparative Examples 1 to 7, where the SiH/Vi ratio of both layers is not within a preferred range, the electrode layer peels off in the peel test, and the adhesion and trackability of the two layers are considered insufficient.

The invention claimed is:

1. A laminate body, comprising a structure with two or more laminated organopolysiloxane cured films obtained by curing curable organopolysiloxane compositions with different compositions where at least a portion of functional groups involved in the curing reaction are the same, wherein the laminated organopolysiloxane cured films have structures chemically bonded at an interface thereof: wherein the curable organopolysiloxane compositions, which are cured to provide an organopolysiloxane cured film, at least contain:

(A) an organopolysiloxane with a curing reactive group having at least two carboncarbon double bonds in one molecule;

(B) an organohydrogenpolysiloxane having at least two silicon-bonded hydrogen atoms in the molecule, in (in an amount within a range in which the amount of silicon atom-bonded hydrogen atoms in this component is 0.5 to 2.5 mol per 1 mol of the total amount of carbon-carbon double bonds in the composition; and component); and (C) an effective amount of a hydrosilylation reaction catalyst;

wherein the laminated organopolysiloxane cured films have structures chemically bonded at an interface thereof by a hydrosilylation reaction between the aforementioned component (A) and component (B);

wherein one of the organopolysiloxane cured films contains electrically conductive microparticles, in which the substance amount [SiH/Vi] Elec of silicon atom-bonded hydrogen atoms in an organohydrogenpolysiloxane component is 0.5 mols or more to 1.0 mol or less per 1 mol of the total amount of carbon-carbon double bonds in the composition;

wherein the other of the organopolysiloxane cured films is a dielectric layer and does not contain electrically conductive microparticles, and the substance amount [SiH/Vi]$_{DEAP}$ of silicon atom-bonded hydrogen atoms in an organohydrogenpolysiloxane component per 1 mol of carbon-carbon double bonds in the composition is more than 1.0 mol to 2.0 mol; and wherein the value of [SiH/ViJriec/[SiH/Vi]pEap is within a range of 0.33 to 0.85.

2. The laminate body according to claim 1, wherein at least one of the laminated organopolysiloxane cured films has a volume resistivity of $10^2$ Ω·cm or less.

3. The laminate body according to claim 1, wherein at least one of the laminated organopolysiloxane cured films has a shear storage modulus (G') at 120° C. within a range of $5.0 \times 10^4$ to $1.5 \times 10^5$ Pa.

4. The laminate body according to claim 1, wherein at least one of the laminated organopolysiloxane cured films contains electrically conductive microparticles.

5. The laminate body according to claim 4, wherein the electrically conductive microparticles contain at least one type of electrically conductive carbon selected from electrically conductive carbon black, graphite, and vapor phase grown carbon (VGCF).

6. The laminate body according to claim 1, wherein at least one of the laminated organopolysiloxane cured films is an electrode layer, and the other is a dielectric layer.

7. The laminate body according to claim 1, wherein the laminated organopolysiloxane cured films are organopolysiloxane cured films obtained by curing curable organopolysiloxane compositions with mutually different compositions, one of the organopolysiloxane cured films is a cured film obtained by curing (I) a curable organopolysiloxane composition in which silicon atom-bonded hydrogen atoms in an organohydrogenpolysiloxane component are more than 1.0 mol and 2.0 mols or less per 1 mol of the total amount of carbon-carbon double bonds in the composition, and the other of the organopolysiloxane cured films is a cured film obtained by curing (II) a curable organopolysiloxane composition in which silicon atom-bonded hydrogen atoms in an organohydrogenpolysiloxane component are 0.5 mols or more and 1.0 mol or less per 1 mol of carbon-carbon double bonds in the composition.

8. The laminate body according to claim 6, wherein the organopolysiloxane cured film serving as the electrode layer is laminated on at least one surface of the organopolysiloxane cured film serving as the dielectric layer, and the laminated organopolysiloxane cured films have structures chemically bonded at an interface thereof.

9. A transducer member, comprising the laminate body according to claim 1.

10. A transducer, comprising the laminate body according to claim 1.

11. An electronic component or display device, comprising the laminate body according to claim 1.

12. A method of manufacturing the laminate body according to claim 1, comprising:

step I: curing one type of curable organopolysiloxane composition of two or more curable organopolysiloxane compositions with different compositions, in which at least a portion of functional groups involved in a curing reaction are the same into a film shape to obtain an organopolysiloxane cured film; and step II: coating a curable organopolysiloxane composition different from step I into a film shape onto the organopolysiloxane cured film of step I or a precursor thereof at the same time as step I or after step I and then advancing a curing reaction to laminate a different organopolysiloxane cured film on the organopolysiloxane cured film of step I.

13. The method of manufacturing the laminate body according to claim 12, wherein the organopolysiloxane cured film of step I is a dielectric layer and the organopolysiloxane cured film of step II is an electrode layer.

14. The method of manufacturing the laminate body according to claim 12, wherein step II includes a step of coating a curable organopolysiloxane composition different from step I into a film shape, further laminating another organopolysiloxane cured film or precursor thereof, in a condition with a coating layer of the curable organopolysiloxane composition in an uncured or semi-cured state, onto the coating layer, optionally repeating the same step two or more times to form a laminated body in which one or more coating layer of the uncured or semi-cured curable organopolysiloxane composition is laminated with the organopolysiloxane cured film or precursor thereof, and then completely advancing the curing reaction on the coating layer of the curable organopolysiloxane composition different from step I to laminate a different organopolysiloxane cured film on the organopolysiloxane cured film of step I.

15. A method of forming an electrode layer in a transducer member, comprising the method of manufacturing the laminate body according to claim 12.

* * * * *